United States Patent

Vaahs et al.

Patent Number: 5,187,252
Date of Patent: Feb. 16, 1993

[54] SILAZANE POLYMERS CONTAINING SICL GROUPS, PROCESS FOR THEIR PREPARATION, SILICON NITRIDE-CONTAINING CERAMIC MATERIALS WHICH CAN BE PREPARED FROM THEM, AND THEIR PREPARATION

[75] Inventors: Tilo Vaahs, Kelkheim; Hans-Jerg Kleiner, Kronberg; Martin Brück, Hofheim am Taunus, all of Fed. Rep. of Germany

[73] Assignee: Hoechst Aktiengesellschaft, Frankfurt am Main, Fed. Rep. of Germany

[21] Appl. No.: 645,264

[22] Filed: Jan. 24, 1991

[30] Foreign Application Priority Data

Jan. 27, 1990 [DE] Fed. Rep. of Germany ....... 4002383

[51] Int. Cl.$^5$ .............................................. C08G 77/26
[52] U.S. Cl. ........................................ 528/33; 528/34; 528/38; 556/410; 501/92
[58] Field of Search ............................. 528/33, 34, 38; 556/410; 501/92

[56] References Cited

U.S. PATENT DOCUMENTS

| | | | |
|---|---|---|---|
| 4,397,828 | 8/1983 | Seyferth et al. | 423/344 |
| 4,482,669 | 11/1984 | Seyferth et al. | 524/442 |
| 4,543,344 | 9/1985 | Cannady | 501/92 |
| 4,595,775 | 6/1986 | Arkles | 556/409 |
| 4,992,523 | 2/1991 | Bacque et al. | 528/34 |
| 5,032,663 | 7/1991 | Vaahs et al. | 528/34 |

OTHER PUBLICATIONS

Wills, R. R., et al., *Ceramic Bulletin* 62:904-915, vol. 8 (1983).

Primary Examiner—Melvyn I. Marquis

[57] ABSTRACT

The invention relates to novel silazane polymers containing SiCl groups, to their preparation, to their conversion into silicon nitride-containing ceramic material, and to this material itself. In order to prepare the silazane polymers containing SiCl groups, $\alpha,\omega$-chlorosilazanes of the formula I

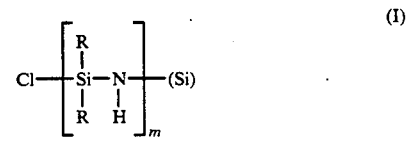

in which m has a value of from 1 to 12 and —(Si) is a silyl radical of the formula —SiHR$^1$Cl, —SiR$^2$R$^3$Cl, —SiR$^4$Cl$_2$, —SiR$^5$Cl-CH$_2$CH$_2$-SiR$^5$Cl$_2$ or —SiCl$_2$-CH$_2$CH$_2$-SiR$^6$Cl$_2$, and R is C$_1$-C$_6$-alkyl or C$_2$-C$_6$-alkenyl and, independently of one another, R$^1$-R$^6$ are H, C$_1$-C$_6$-alkyl or C$_2$-C$_6$-alkenyl, to a temperature of from 100° C. to 400° C.

The silazane polymers according to the invention containing in SiCl groups can be reacted with ammonia to give polysilazanes, which can themselves be pyrolyzed to give silicon nitride-containing ceramic materials.

5 Claims, No Drawings

SILAZANE POLYMERS CONTAINING SICL GROUPS, PROCESS FOR THEIR PREPARATION, SILICON NITRIDE-CONTAINING CERAMIC MATERIALS WHICH CAN BE PREPARED FROM THEM, AND THEIR PREPARATION

The invention relates to novel silazane polymers containing SiCl groups, to their preparation, to their conversion into silicon nitride-containing ceramic material, and to this material itself.

The pyrolysis of polysilazanes to give silicon nitride-containing ceramic material has already been described in the literature (R.R. Wills et al., Ceramic Bulletin, Vol. 62 (1983), 904–915).

Polysilazanes are generally prepared by reacting chlorosilanes as starting materials with ammonia or primary or secondary amines (U.S. Pat. No. 4,540,703, U.S. Pat. No. 4,543,344, U.S. Pat. No. 4,595,775, U.S. Pat. No. 4,397,828 and U.S. Pat. No. 4,482,669).

The present invention provides novel starting materials for polysilazanes, namely chlorine-containing silazane polymers.

The present invention relates to a process for the preparation of silazane polymers containing SiCl groups which comprises heating an $\alpha,\omega$-chlorosilazane of the formula I

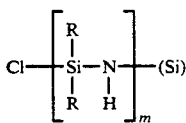

in which m has a value of 1 to 12 and —(Si) is a silyl radical of the formula —SiHR$^1$Cl, —SiR$^2$R$^3$Cl, —SiR$^4$Cl$_2$, —SiR$^5$Cl—CH$_2$CH$_2$—SiR$^5$Cl$_2$ or —SiCl$_2$—CH$_2$CH$_2$—SiR$^6$Cl$_2$, and R is $C_1$-$C_{56}$-alkyl or $C_2$-$C_6$-alkenyl and, independently of one another, R$^1$-R$^6$ are H, $C_1$-$C_6$-alkyl or $C_2C_6$-alkenyl, to a temperature of from 100° C. to 400° C. R is preferably CH$_3$ and, independently of one another, R$^1$-R$^6$ are preferably H, $C_1$-$C_3$-alkyl or $C_2$-$C_3$-alkenyl. R is particularly preferably CH$_3$ and, independently of one another, R$^1$-R$^6$ are particularly preferably H, CH$_3$ or vinyl.

The starting material is preferably heated to a temperature of from 150° C. to 250° C.

During the reaction, the chlorosilanes CH$_3$SiHCl$_2$ and CH$_3$SiH$_2$Cl and a little hydrogen are produced as volatile products. The chlorosilanes can be collected in a cold trap. In addition to these volatile products, solid components are also produced. When the reaction is complete, they are dissolved as far as possible in polar or nonpolar solvents which are inert toward the reaction mixture, e.g. pentane, hexane, toluene, diethyl ether, THF, etc.

Insoluble constituents can be filtered off and the clear filtrate freed from solvents, leaving the silazane polymer containing SiCl groups; this generally has the following elemental composition:

| | |
|---|---|
| Silicon | 35–55% by weight |
| Carbon | 15–35% by weight |
| Nitrogen | 10–25% by weight |
| Hydrogen | 5–10% by weight |
| Chlorine | 5–30% by weight |
| Oxygen | 0–5% by weight |

Accordingly, the present invention furthermore relates to silazane polymers containing SiCl groups which can be obtained by heating an $\alpha,\omega$-silazane of the formula I

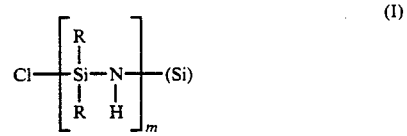

in which m has a value of from 1 to 12 and —(Si) is a silyl radical of the formula —SiHR$^1$Cl, —SiR$^2$R$^3$Cl, —SiR$^4$Cl$_2$, —SiR$^5$Cl—CH$_2$CH$_2$—SiR$^5$Cl$_2$ or —SiCl$_2$—CH$_2$CH$_2$—SiR$^6$Cl$_2$, and R is $C_1$-$C_6$-alkyl or $C_2$-$C_6$-alkenyl and, independently of one another, R$^1$-R$^6$ are H, $C_1$-$C_6$-alkyl or $C_2$-$c_6$-alkenyl, to a temperature of from 100° C. to 400° C.

The duration of the reaction in the preparation of the silazane polymers according to the invention containing SiCl groups (alternatively called polymeric chlorosilazanes below) depends on the heating rate and on the reaction temperature. In general, a reaction time of from 3 to 7 hours is sufficient.

It is also possible to carry out the reaction in an organic solvent. Suitable solvents are those which are inert toward the reactants and have a sufficiently high boiling point, i.e. for example, saturated aliphatic or aromatic hydrocarbons, such as n-decane, decalin, xylene, toluene, chlorinated hydrocarbons, such as chlorobenzene, or ethers, such as dibenzyl ether or diethylene glycol diethyl ether. If a solvent is used in which the NH$_4$Cl formed is insoluble, the latter may be separated off by filtration. The silazane polymers according to the invention containing SiCl groups are then obtained by removing the solvent by distillation under reduced pressure.

If desired, the process may also be carried out under reduced pressure or at pressures in the range from 1 to 10 atmospheres.

The process may also be carried out continuously.

The $\alpha,\omega$-chlorosilazanes from which the polymeric chlorosilazanes according to the invention are prepared can be obtained by reacting an oligohydridoorganylsilazane of the formula [—RSiH—NH—]$_n$ in which n is from about 3 to 12 with at least one of the chlorosilanes R$^1$HSiCl$_2$, R$^2$R$^3$SiCl$_2$, R$^4$SiCl$_3$, Cl$_2$R$^5$SiCH$_2$CH$_2$SiR$^5$Cl$_2$ or Cl$_3$SiCH$_2$CH$_2$SiR$^6$Cl$_2$, where R is $C_1$-$C_6$-alkyl or $C_2$-$C_6$-alkenyl and, independently of one another, R$^1$-R$^6$ are H, $C_1$-$C_6$-alkyl or $C_2$-$C_6$-alkenyl, at from −20° C. to +50° C.

The chlorosilanes R$^1$HSiCl$_2$, R$^2$R$^3$SiCl$_2$, and R$^4$SiCl$_3$ employed as starting materials for the $\alpha,\omega$-chlorosilazanes of the formula (I) are commercially available, and the ethylenebridged chlorosilanes Cl$_2$R$^5$SiCH$_2$CH$_2$SiR$^5$Cl$_2$ and Cl$_3$SiCH$_2$CH$_2$SiR$^5$Cl$_2$ can be obtained by hydrosilylation of R$^1$HSiCl$_2$ and ethyne or by hydrosilylation of vinyltrichlorosilane and R$^1$HSiCl$_2$. The oligohydridoorganylsilazanes also used as starting materials for (I) are prepared by reacting a dichlorohydridoorganylsilane RSiHCl$_2$ where R is as defined above with NH$_3$ in a solvent, as described in U.S. Pat. No. 4,482,669 (see, in particular, columns 4, 5, 7 and 8 therein). This reaction generally gives a mixture of cyclic oligohydridoorganylsilazanes [—RSiH—NH—]$_n$ where n is from about 3 to about 12. For the reaction with said chlorosilanes, the oligohydridoorganylsilazanes [—RSiH—NH—]$_n$ are preferably initially introduced without a solvent and the chlorosilanes are carefully added. The reaction temperature is from −20° C. to +50° C., preferably from −10° C. to 0° C. It is also possible to carry out the reaction in a solvent which does not react with the reactants.

Thus, the oligosilazane can be initially introduced in a solvent or as a pure substance and the chlorosilane can be added in pure form or as a solution. Examples of solvents which are suitable for the reaction are saturated aliphatic or aromatic hydrocarbons, such as n-pentane, cyclohexane, toluene or chlorinated hydrocarbons, such as chloroform or chlorobenzene, or ethers, such as diethyl ether or THF.

The novel polymeric chlorosilazanes can be reacted with ammonia ("ammonolysis") to give polysilazanes, which can themselves be converted into silicon nitride-containing ceramic material by pyrolysis.

The ammonolysis may be carried out in liquid NH$_3$, but it is advantageously carried out in an organic solvent. Suitable solvents are all those which are inert toward the silazanes. Preferred solvents are those in which the ammonium chloride produced as a by-product has low solubility and is easily separated off, for example ethers, aliphatic and aromatic hydrocarbons and chlorinated hydrocarbons. In the ammonolysis, the reactants may be introduced into the reaction vessel in any desired sequence, but it is usually advantageous to initially introduce the polymeric chlorosilane in solution and to feed in gaseous ammonia or to add liquid ammonia. If the polymeric chlorosilazanes according to the invention have been prepared in a suitable organic solvent, the ammonolysis can be carried out in this solvent without prior removal of the NH$_4$Cl. The ammonolysis is preferably carried out in an excess of NH$_3$ in order to ensure that the reaction is complete and that the end products are as free from chlorine as possible. In general, twice the stoichiometric amount is sufficient for this purpose.

In general, the reaction is carried out at a temperature of from about −50° to +100° C., preferably from −20° to 30° C., in particular at room temperature (with ice cooling). However, it is also possible to carry out the reaction at above room temperature, for example at the boiling point of the solvent used, or below room temperature, for example at −33° C. when liquid NH$_3$ is used.

When the ammonolysis is complete, any excess NH$_3$ is removed and the ammonium chloride produced is filtered off. In order to increase the yield, the precipitate can be washed with one of the abovementioned organic solvents. Removal of the solvent by distillation under reduced pressure gives the polysilazanes directly as a white powder. The polysilazanes are soluble in the above organic solvents and can thus be used both for coating surfaces and for the production of fibers.

The polysilazanes can be pyrolyzed in an inert nitrogen or argon atmosphere at a temperature of from 800° to 1,200° C. to give amorphous, dense materials which essentially comprise Si, N and C and may also contain traces of H and 0. At pyrolysis temperatures of above 1,200° C., for example in the range from 1,200° C. to 1,400° C., partially amorphous, microcrystalline ceramic materials which contain α—Si$_3$N$_4$ as the crystalline phase are produced.

A particular advantage is that the polysilazanes can be shaped by various processes to give three-dimensional moldings before pyrolysis.

An important shaping method is the drawing of fibers. Fibers can be drawn from highly viscous solutions of the polysilazane in solvents, such as toluene, THF or hexane. The fibers are advantageously drawn by means of spinnerets with a diameter of from 80 to 150 μm. Subsequent drawing tapers the filament so that, after pyrolysis, a very strong filament with a diameter of from 2 to 20 μm, in particular from 5 to 15 μm, is produced. The fibers produced by subsequent pyrolysis are used as mechanical reinforcement inserts in fiber-reinforced aluminum, aluminum alloys and ceramic components.

A further important possible way of processing the polysilazanes is the production of dense, highly adherent, amorphous or microcrystalline ceramic coatings on metals, in particular steels, or on ceramics, such as Al$_2$O$_3$, ZrO$_2$, MgO, SiC or Si$_3$N$_4$. The coating is carried out with the aid of a solution of the polysilazane in an organic solvent, such as toluene, THF or hexane. The pyrolytic conversion into an amorphous or microcrystalline layer is carried out in the same temperature range 5 of from 800° to 1,200° C. or from 1,200° to 1,400° C. under an inert gas, as described above for three-dimensional moldings.

Due to their excellent adhesion, great hardness and surface quality, the ceramic coatings are particularly suitable for the surface finishing of machine components which are subjected to mechanical load and chemical attack.

The above-described polysilazanes can furthermore be pyrolyzed in an equally good ceramic yield of from 70 to 90% in an NH$_3$ atmosphere instead of in an inert gas. This results in a virtually carbon-free, glass-clear, colorless material. On the pyrolysis in NH$_3$ at 1,000° C. or more, the carbon content is below 0.5% by weight. Depending on the pyrolysis temperature, the pyrolysis product comprises virtually pure amorphous silicon nitride (pyrolysis at below 1,200° C.) or crystalline Si$_3$N$_4$ (pyrolysis at above 1,200° C., in particular above 1,300° C.). Pyrolysis in NH$_3$ can be used on all moldings produced by the above-described shaping processes, i.e. on moldings, fibers and coatings shaped from powders.

The invention thus furthermore relates to a process for the preparation of silicon nitride-containing ceramic material which comprises reacting one of the abovementioned polymeric chlorosilazanes, characterized by their formula or their preparation process, with ammonia at from −50° to +100° C. and pyrolyzing the resultant polysilazane in an inert nitrogen or argon atmosphere or in an ammonia atmosphere at from 800° to 1,400° C.

However, the conversion of the polymeric chlorosilazane into silicon nitride-containing ceramic material is preferably carried out in a process in which the polysilazane formed as an intermediate is not isolated. In this case, the polymeric chlorosilazane is preferably reacted with gaseous ammonia, and the resultant reaction mixture is pyrolyzed in an ammonia atmosphere.

Accordingly, the invention furthermore relates to a process for the preparation of silicon nitride-containing ceramic material which comprises reacting one of the abovementioned polymeric chlorosilazanes, characterized by their formula or their preparation process, with ammonia at from 0° to +300° C., and pyrolyzing the reaction product in an NH$_3$ atmosphere at from 800° to 1,400° C.

EXPERIMENTAL REPORT

1. Preparation of oligohydridomethylsilazane [—CH$_3$SiH—NH—]$_n$.

100 ml (0.97 mol) of methyldichlorosilane were dissolved in 800 ml of absolute THF, and ammonia was passed in (rate: 0.5 l/min) for 3 hours. The reaction temperature was kept in the range from 10° to 15° C. by cooling with an ice bath. In order to complete the reaction, the mixture was stirred at room temperature for 1 hour, and the ammonium chloride was subsequently separated off under argon. The precipitate was washed twice with 350 ml of THF in each case, and the combined THF solutions were evaporated under reduced pressure, giving a clear, readily mobile oil of [—CH$_3$SiH—NH—]$_n$ where n=3-12 in a yield of 44.5 g=78% of theory.

2. Reaction of [—CH$_3$SiH—NH—]$_n$ with CH$_3$SiHCl$_2$.

100 g (1.7 mol, based on n 1) of [—CH$_3$SiH—NH—]$_n$ (n=3-12) were cooled to −5° C. 48.9 g (0.425 mol) of CH$_3$SiHCl$_2$ were then slowly added dropwise with stirring, and said temperature was maintained for a further 60 minutes.

200 ml of THF were subsequently added, and dimethylamine was passed in until saturation was achieved without the temperature of the reaction mixture exceeding 0° C. The precipitated dimethylamine hydrochloride was filtered off, the filtrate was freed from solvent and volatile components.

The resultant oily product was separated by gas chromatography, and the individual fractions were investigated by mass spectrometry.

The following molecules were detected, inter alia:

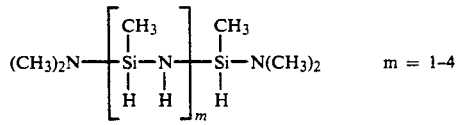

These dimethylamino derivatives are produced from the reactive α,ω-dichlorosilazanes:

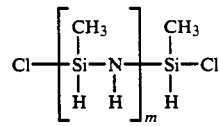

3. Reaction of [—CH$_3$SiH—NH—]$_n$ with vinylmethyldichlorosilane.

100 g (1.7 mol, based on n=1) of [—CH$_3$SiH—NH—]$_n$ (n=3-12) were cooled to −5° C. 70.5 g (0.5 mol) of vinylmethyldichlorosilane were then slowly added dropwise with stirring, and said temperature was maintained for a further 60 minutes.

200 ml of THF were subsequently added, and dimethylamine was passed in until saturation was achieved without the temperature of the reaction mixture exceeding 0° C.

The precipitated dimethylamine hydrochloride was filtered off, and the filtrate was freed from solvent.

The resultant oily product was separated by gas chromatography, and the individual fractions were investigated by mass spectrometry.

The following molecules were detected, inter alia:

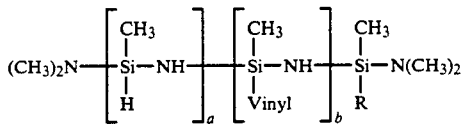

where the variables have the following meanings:
1. a=1, b=0, R=vinyl
2. a=2, b=0, R=vinyl
3. a=3, b=0, R=vinyl
4. a=1, b=1, R=vinyl
5. a=2, b=1, R=vinyl
6. a=3, b=1, R=H These dimethylamino derivatives were produced from the corresponding α,ω-dichlorosilazanes.

EXAMPLE 1

Reaction of [—CH$_3$SiH—NH—]$_n$ with CH$_3$SiHCl$_2$, and subsequent preparation of a silazane polymer containing SiCl groups.

100 g (1.0 mol, based on n 1) of [—CH$_3$SiH—NH—]$_n$ (n=3-12) were cooled to −5° C. 48.9 g (0.425 mol) of CH$_3$SiHCl$_2$ were then slowly added dropwise with stirring, and said temperature was maintained for a further 60 minutes.

The mixture was subsequently heated to an oil-bath temperature of 220° C. over the course of 4 hours. The internal temperature was 190° C. After 2 hours at this temperature, the mixture was allowed to cool.

At 20° C., 110 g of a hard, brittle substance remained, which was dissolved in THF and filtered to remove insoluble constituents. The filtrate was freed from the solvent, leaving a clear material which was glassy and brittle at 20° C. and had a softening point which was reproducibly at about 120° C. (95 g).

Analytical data (in % by weight):
Si,44.7%; C,19.2%, N, 17.9%; H, 6.9%; Cl, 11.3% .

Ceramic yield on pyrolysis in N$_2$ up to 1100° C.: 68.5%.

Ceramic yield on pyrolysis in NH$_3$ up to 1100° C.: 58.9 %,

EXAMPLE 2

Reaction of [—CH$_3$SiH—NH—]$_n$ with vinylmethyldichlorosilane and a subsequent preparation of a silazane polymer containing SiCl groups.

100 g (1.7 mol, based on n 1) of [—CH$_3$SiH—NH—]$_n$ (n=3-12) were cooled to −5° C. 70.5 g (0.5 mol) of vinylmethyldichlorosilane were then slowly added dropwise with stirring, and said temperature was maintained for a further 60 minutes.

The mixture was subsequently heated to an oil-bath temperature of 220° C. over the course of 4 hours. The internal temperature was 205° C. After 2 hours, the mixture was allowed to cool.

At 20° C., 114 g of a mixture of a very viscous oil and solid components remained. THF was added, and the mixture was filtered. The clear filtrate was freed from the solvent, leaving a clear, slightly yellowish, very viscous oil which had a viscosity of about 5 poise.

Analytical data (in % by weight):
Si, 38.2%; C, 31.1%; N, 16.2%; H, 7.2%; Cl 7.3%.

Ceramic yield on pyrolysis in $N_2$ up to 1100° C.: 54.2%

Ceramic yield on pyrolysis in $NH_3$ up to 1100° C.: 42.1%

EXAMPLE 3

Reaction of the silazane polymer from Example 1 containing SiCl groups with ammonia to prepare an $Si_3N_4$-containing ceramic material.

20 g of the polymeric chlorosilazane from Example 1 were dissolved in 200 ml of THF (under a protective gas) and subsequently reacted at an internal temperature of 5°–10° C. with ammonia until saturation is achieved, during which all the SiCl groups of the polysilazane employed had been substituted by NH groups.

The precipitated ammonium chloride was filtered off, and the clear, colorless filtrate was freed from the solvent and excess $NH_3$, leaving an infusable, but soluble white powder having the composition:

| Si | 47.1% by weight |
|----|-----------------|
| H  | 8.1% by weight  |
| C  | 22.5% by weight |
| N  | 21.8% by weight |

Ceramic yield on pyrolysis in $N_2$ up to 1100° C.: 79.1% by weight.

Ceramic yield on pyrolysis in $NH_3$ up to 1100° C.: 74.9% by weight.

We claim:

1. A process for the preparation of a silazane polymer containing SiCl groups, which comprises heating an α,ω-chlorosilazane of the formula I

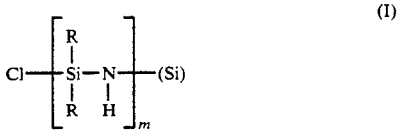

in which m has a value of from 1 to 12 and —(Si) is a silyl radical of the formula —$SiHR^1Cl$, —$SiR^2R^3Cl$, —$SiR^4Cl_2$, —$SiR^5Cl$—$CH_2CH_2$—$SiR^5Cl_2$ or —$SiCl_2$—$CH_2CH_2$—$SiR^6Cl_2$, and R is $C_1$-$C_6$-alkyl or $C_2$-$C_6$-alkenyl and, independently of one another, $R^1$-$R^6$ are H, $C_1$-$C_6$-alkyl or $C_2$-$C_6$-alkenyl, to a temperature of from 100° C. to 400° C.

2. A process for the preparation of a silazane polymer containing SiCl groups, which comprises heating an α,ω-chlorosilazane which has been obtained by reacting an oligohydridoorganylsilazane of the formula [—R-SiH—NH—]$_n$, in which n is from about 3 to about 12, with at least one of the chlorosilanes $R^1HSiCl_2$, $R^2R^3SiCl_2$, $R^4SiCl_3$, $Cl_2R^5SiCH_2CH_2SiR^5Cl_2$ or $Cl_3SiCH_2CH_2SiR^6Cl_2$ at from −20° C. to 50° C., where R is $C_1$-$C_6$-alkyl or $C_2$-$C_6$-alkenyl and, independently of one another, $R^1$-$R^6$ are H, $C_1$-$C_6$-alkyl or $C_2$-$C_6$-alkenyl, to a temperature of from 100° C. to 400° C.

3. The process as claimed in claim 1, wherein R is $CH_3$ and, independently of one another, $R^1$-$R^6$ are H, $CH_3$ or $C_2$-$C_3$alkenyl.

4. The process as claimed in claim 1, wherein R is $CH_3$ and, independently of one another, $R^1$-$R^6$ are H, $CH_3$ or vinyl.

5. A silazane polymer containing SiCl groups, obtained by the process as claimed in claim 1.

* * * * *